(12) United States Patent
Olson

(10) Patent No.: US 6,243,935 B1
(45) Date of Patent: Jun. 12, 2001

(54) MODULAR WORK SURFACE AND METHOD FOR MAKING SAME

(75) Inventor: Don B. Olson, Bonita Springs, FL (US)

(73) Assignee: Etura Premiere, LLC, West Palm Beach, FL (US)

( * ) Notice: Subject to any disclaimer, the term of this patent is extended or adjusted under 35 U.S.C. 154(b) by 0 days.

(21) Appl. No.: 09/335,651

(22) Filed: Jun. 18, 1999

Related U.S. Application Data

(63) Continuation-in-part of application No. 08/745,993, filed on Nov. 8, 1996, now abandoned, which is a continuation-in-part of application No. 08/587,274, filed on Jan. 18, 1996, now abandoned.

(51) Int. Cl.$^7$ .................................................. B23P 17/00
(52) U.S. Cl. ................................ 29/423; 29/446; 29/449; 29/523.7; 29/527.1; 249/177; 264/299
(58) Field of Search ....................... 29/527.1, 446, 29/449, 423, 527.3; 264/239, 259, 299, 328.18, 219; 108/161, 140.3, 140.14; 52/782.2, 796.11; 269/142, 177

(56) References Cited

U.S. PATENT DOCUMENTS

| | | | | |
|---|---|---|---|---|
| 4,088,727 | * | 5/1978 | Elliott ................................ | 264/130 |
| 4,093,173 | * | 6/1978 | Kawamata et al. ................. | 249/105 |
| 4,668,451 | * | 5/1987 | Langson ............................. | 264/39 |
| 4,672,006 | * | 6/1987 | McGraw ............................. | 428/528 |
| 5,685,441 | * | 11/1997 | Calfee ............................... | 211/194 |
| 5,950,558 | * | 9/1999 | Strong .............................. | 114/267 |
| 6,000,673 | * | 12/1999 | Bordener .......................... | 249/53 R |

* cited by examiner

Primary Examiner—S. Thomas Hughes
Assistant Examiner—John C. Hong
(74) Attorney, Agent, or Firm—Mueller and Smith, LPA

(57) ABSTRACT

A self-supporting, solid surface (SS) work surface adapted to be installed atop a support structure is manufactured from one or multiple modules that are joined together to form a visually single SS work surface. Each module includes a centrally-disposed molded work surface have a bottom face and a top face, has a given thickness, and has at least a first edge and a second edge. A first molded edge portion is joined to the first edge and extends downwardly from the centrally-disposed molded work surface. A molded second edge portion is joined to the second edge and extends upwardly from the centrally-disposed molded work surface. At least one molded brace portion is joined to the bottom brace of the centrally-disposed molded work surface to make the module self-supporting at the centrally-disposed molded work surface. The centrally-disposed molded work surface, the molded first edge portion, and the second molded edge portion all are integrally molded together. One or more of the molded first edge portion and the bottom brace are adapted to rest upon the support structure. Each SS module is made by placing plugs in a mold to leave spaces or cavities that define the module. The cavities then are filled with moldable resinous mixture that is permitted to at least partially cure to form the module. Finally, the module is removed from the mold.

27 Claims, 4 Drawing Sheets

MODULAR WORK SURFACE AND METHOD FOR MAKING SAME

CROSS REFERENCE TO RELATED APPLICATIONS

This application is a continuation-in-part of U.S. Ser. No. 08/745,993, filed on Nov. 8, 1996, (now abandoned) which in turn is a continuation-in-part of U.S. Ser. No. 08/587,274, filed Jan. 18, 1996, (now abandoned) the disclosures of which are hereby incorporated by reference.

STATEMENT REGARDING FEDERALLY SPONSORED RESEARCH

None

BACKGROUND OF THE INVENTION

The invention generally relates to solid surfaces (SS's) or sold surface work surfaces, and more particularly to SS's configured from self-supporting modules.

Solid surfaces, as such term is used in this field, generally are materials which do not require a separate finished surface, are uniformly colored, and are free of porosity. A homogeneous solid sheet of material can be used in a variety of applications due to their durability, such as, for example, kitchen countertops, bathroom vanities, shower walls, windowsills, tables, desks, and urinal dividers. SS's were popularized under the trademark CORIAN® as described in expired U.S. Pat. No. 3,847,865.

Referring to FIGS. 2 and 3 of the drawings, solid surface work surfaces have previously been manufactured by fabricating sheets of SS. For example, FIG. 2 shows a cross-section of kitchen cabinet/countertop structure 20 having an main countertop 30 that is fabricated from a sheet of, for example, CORIAN® material. Cabinet/countertop structure 20 is formed from cabinet 24, which is made from cabinet walls 26 and cabinet door 28, and main countertop 30, which surmounts cabinet 24 and is formed from main countertop 30, back splash 32, and one or more border pieces 34.

Referring to FIG. 3, the CORIAN® SS used to fabricate the work surface 22 is manufactured in continuous sheets, such as sheet 36. These sheets usually are cut or molded into sections twelve feet in length and purchased by fabricators. The fabricator then divides the sheet into three sections. First section 38 is used as main countertop 30. Second section 40 is used as back splash 32. Third section 42 is used as border pieces 34 affixed to the front and sides of countertop 30. As shown in FIG. 2, the completed cabinet/countertop structure 20 is placed on supports 44 and then mounted atop cabinet 24.

Sheet 36 in FIG. 3 is laid out and cut to the desired shape of the countertop to be installed. Back splash 32 and border pieces 34, if used, are adhesively joined together with main countertop 30 then cured typically for 30 minutes and as long as 3 hours in cold weather, i.e., curing time is temperature dependant. The resulting joint typically is "seamless". Following curing, supports 44 are attached to the underside of countertop 30 to support cabinet/countertop structure 20 atop cabinet 24. Without supports 44, main countertop 30 will sag over time and with use. Thus, the prior art SS depicted in FIGS. 2 and 3 is not "self-supporting". That is, braces or supports are required to support the weight of countertop 30 across its length and width and to support pressure applied to countertop 30 during its use, e.g., cutting foods, weights of appliances stored thereon, and the like.

The design and installation of prior art SS's, such as described above, is a time consuming and a labor consuming process that includes, inter alia, cutting, fitting, gluing, drying time, and trimming off of excess edging. The gluing process also can cause flaws and/or weaken the finished product, which will result in cracking of the SS, if this operation is not performed in a very precise manner. Many precautions are required in order to properly adhere or glue SS pieces together, such as, for example, corner support blocks, extra material, special colored gluing kits, wood backing, just to name but a few labor of the intensive gluing techniques that are required to be employed in order to make a seamless, yet strong, SS joint. Then, too, the technicians installing the SS's must be trained in these labor-intensive operations. These installation operations with their attendant time make up a significant percentage of the ultimate cost to the consumer that purchases such SS countertops. Many of these consumers are homeowners who would greatly desire cost reductions, if possible. In fact, even the installers would like to reduce their costs by having a much less labor intensive SS system.

SS countertops have also been custom molded by creating unique molds for that particular size and shape cabinet space. These custom countertops, however, pose another problem. They must be specifically fabricated to fit the size and shape of a given location. They cannot be manufactured in generic modules off-site and pieced together on-site, but rather must be specifically designed to fit the particular cabinets or other structures for which they will be used and, although unwieldy, transported to the site intact. Such custom molded SS countertops generally are even more expensive than those described above.

BRIEF SUMMARY OF THE INVENTION

The present invention relates to SS modules adaptable for on-site configuration into variably sized and shaped work surfaces. This method for making a self-supporting work surface module adaptable for mounting onto a cabinet starts with obtaining a mold and selecting one or more plugs from an inventory of plugs of different lengths and widths. The selected plugs are placed into the mold for forming spaces between the mold and the plugs. These spaces define a work surface of predetermined thickness, an integral brace portion, and an integral edge portion. At least one of the brace portion or the edge portion is thicker than the thickness of the work surface and is mountable on a cabinet for providing a self-supporting characteristic to the module work surface when the work surface module is mounted on a cabinet. The spaces then are filled with balanced moldable material and solid filler mix that is permitted to at least partially cure to form the module. Finally, the module is removed from the mold prior to shrinkage. The manufacturing process then can be continued with other plug and mold combinations to form other work surface modules of different sizes and shapes.

These SS modules, if required, then can be combined with each other to configure on-site a work surface of desired size and shape. Because the brace and edge portions of the SS modules are integrally molded together with the SS module during manufacture of the modules off-site, there is no labor cost for fabricating, cutting, gluing, and waiting time these support brace and edge portions to the SS modules as they are being configured into a work surface on-site. The size and location of the support braces in the mold during manufacture of the modules conforms to the shape of a cabinet on-site so that the SS modules are self-supporting, i.e., no additional bracing or supports are required for the SS modules to be supported, for example, on a cabinet.

The SS work surface includes a first self-supporting module having a surface of predetermined appearance finish, size, and shape and also includes a sufficiently strong, integrally-molded first brace portion to provide the first module with self-support and an integrally molded first edge portion having the predetermined appearance finish, and further includes a second self-supporting module having a surface of predetermined appearance finish, size and shape which also includes a sufficiently strong, integrally molded second brace portion to provide the second module with self-support and an integrally molded second edge portion having the predetermined appearance finish. The first and second self-supporting modules cooperate with each other to form the predetermined configuration and appearance finish of the work surface by forming a continuous edge portion and appearance finish with the first and second edge portions and by adapting the first and second brace portions for supporting the work surface on the cabinet. The size and shape of the second self-supporting module may be different from the size and shape of the first self-supporting module.

A self-supporting, solid surface (SS) work surface adapted to be installed atop a support structure is manufactured from two or more modules that are joined together to form a visually single SS work surface. Each module includes a centrally-disposed molded work surface have a bottom face and a top face, has a given thickness, and has at least a first edge and a second edge. A first molded edge portion is joined to the first edge and extends downwardly from the centrally-disposed molded work surface. A molded second edge portion is joined to the second edge and extends upwardly from the centrally-disposed molded work surface. At least one molded brace portion is joined to the bottom brace of the centrally-disposed molded work surface to make the module self-supporting at the centrally-disposed molded work surface. The centrally-disposed molded work surface, the molded first edge portion, and the second molded edge portion all are integrally molded together. One or more of the molded first edge portion and the bottom brace are adapted to rest upon the support structure.

One advantage of the present invention is an improved SS work surface that reduces, if not eliminates, both on-site and off-site fabrication costs. Another advantage of the present invention is a work surface that can be manufactured in self-supporting, variably sized and shaped modules, and sold directly to the ultimate user, so that the user can piece together the modules to form the desired work surface configuration. A further advantage of this invention is a cast or molded solid surface (densified) countertop or work surface with integral support and front edges, which cost effectively utilizes moldable material as needed for the integral support while eliminating the fabrication time necessitated by affix those supports and edging on site.

BRIEF DESCRIPTION OF THE DRAWINGS

For a fuller understanding of the nature and objects of the present invention, reference should be made to the following detailed description taken in conjunction with the accompanying drawings, in which like reference numerals refer to like elements throughout, and in which.

The drawings will be described in detail below.

DETAILED DESCRIPTION OF THE INVENTION

As stated above, the inventive SS's are unique in that they are "dimensionally molded to the inch." By this term is meant that the inventive SS modules are molded to the final installed dimensions. This concept also may be referred to herein as "dimensional pouring" or "poured to size". Very little, if any, trimming of the SS modules is required. Next, since the SS contains pigment, gel time of the resin is important so that the solids do not settle out before curing has taken place. Next, SS is known to curl on its edges, especially with thicker edges. In order to retard such curl, the resin and solid fillers need to be in balance. This balance translates into the inventive SS containing between about 28% and 37% resin by weight with the balance being inert material composed of fillers, tinctorial agents, plasticizers, flow modifiers, rheology modifiers, and like additives typical of molded systems. Within this ratio, it should be noted that the thinner (viscosity) the resin used, the less solid fillers that are required and still a curl free part molded. For present purposes, a "balanced" resinous and solid filler mixture is one that when cured in the configuration of a work surface module is recalcitrant to curling. It should be noted, that a sufficient amount of plasticizer desirably also is included in the resinous mixture to allow the cured product to flex; along with achieving other industry specifications and standards, for example, for hardness, scuff resistance, stain resistance, impact strength, etc. Finally, prior to curing, the poured part is not vibrated too much (vibration releases air bubbles in the poured mix) which again would cause a settling of the solid fillers with attendant curling problems.

Figure 1:
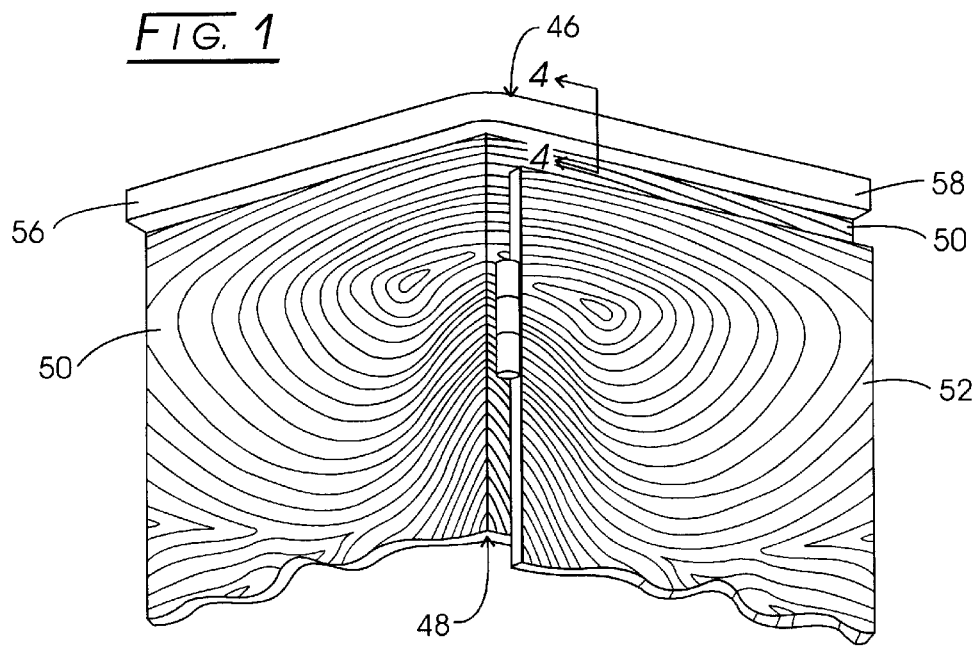
FIG. 1 is a perspective view of a cabinet with the work surface of the present invention thereon.
Figure 2:
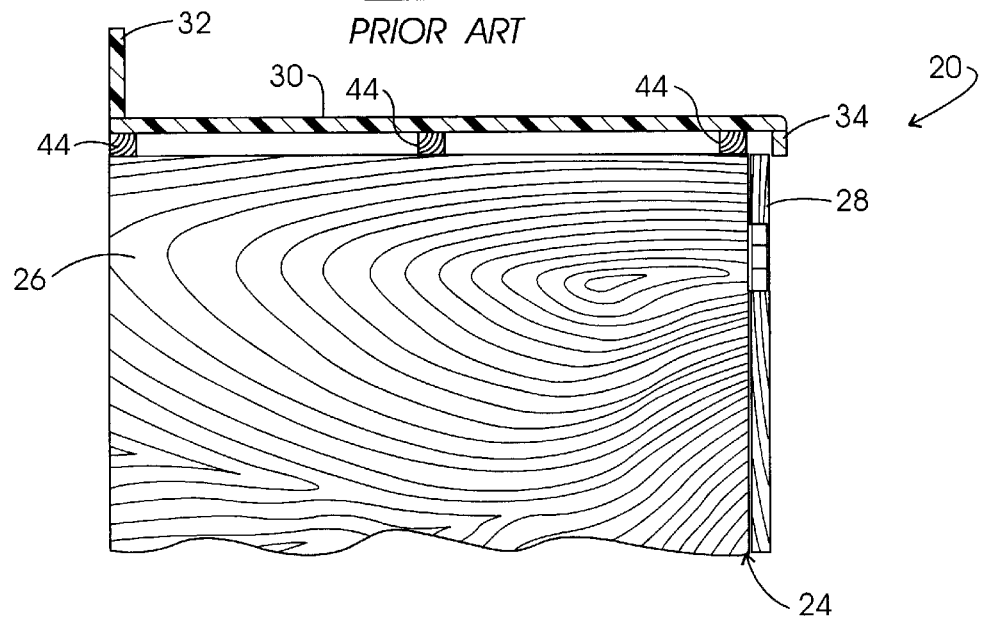
FIG. 2 is a cross-section of a cabinet, partly in elevation, with a prior art solid surface work surface thereon.
Figure 3:
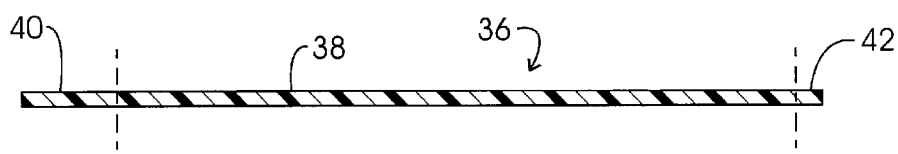
FIG. 3 is a cross-section of a sheet of prior art solid surface material.

Referring to FIG. 1, preferred SS work surface module 46 is seen to rest atop kitchen cabinet 48. While the module 46 shown is illustrated as kitchen cabinet countertop, it should be appreciated that the SS modules of the present invention can be used in a variety of other ways including, inter alia, bathroom vanities, shower walls, window sills, tables, and desks. Cabinet 48 is formed from cabinet walls 50 and cabinet door 52. From FIGS. 1 and 4, SS 46 is seen to include a centrally-disposed work surface 54, integrally-molded side edge 56, integrally-molded front edge 58, and integrally-molded brace 60.

Figure 4:
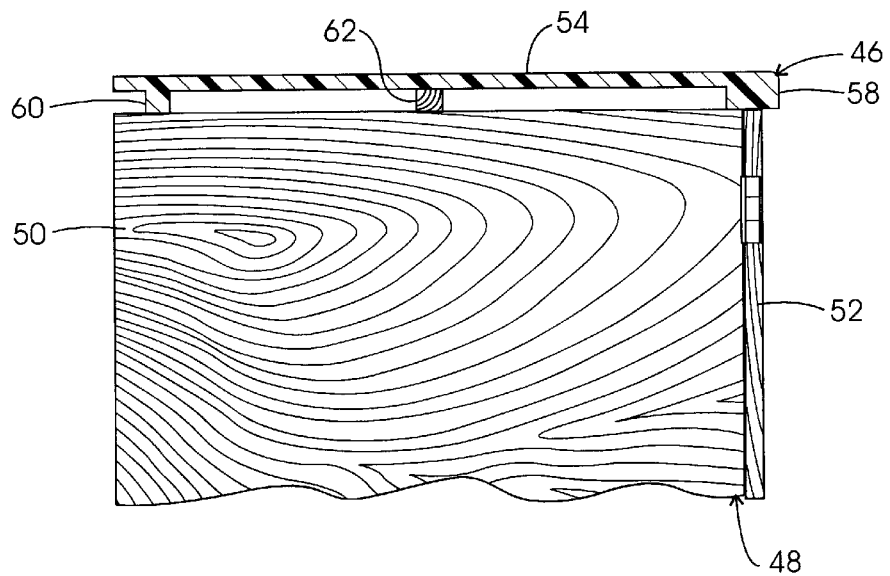
FIG. 4 is a cross-section of a cabinet, taken along line 4—4 in FIG. 1 and partly in elevation, with a modular work surface of the present invention.

Referring to FIG. 4, the cross-section of SS module 46 is shown. Integral front edge 58 and integral support brace 60 are seen to rest upon cabinet 48. The embodiment shown also includes additional temporary, support member 62 attached to the bottom face of centrally-disposed work surface 54. Support member 62 often is needed during the during the sanding operation of the manufacturing process in order to prevent vibration and/or an uneven or wavy surface finish from the sanding operation, and/or as extra support during shipping of module 46. Importantly, temporary support 62 can be removed prior to installation of SS module 46 and is not required in order to provide support to SS module 46 following installation. Rather, support brace 60 and edge portions 56 and 58 are integrally with SS module 46 because they are molded together with module 46. Importantly, also, only integrally-molded brace 60 and edge portions 56/58 are required in order to support module 46, or more accurately, in order to support centrally-disposed work surface 54 of module 46. Because brace 60 and edge portions 56/58 are integrally formed with central work surface 54 to make module 46, module 46 is "self-supporting". No other bracing of supports are required to be added to module 46 for its installation to cabinet 48 nor to support the weight of central work area 54 nor to support loads that central work area 54 carries during its use.

Figure 5:
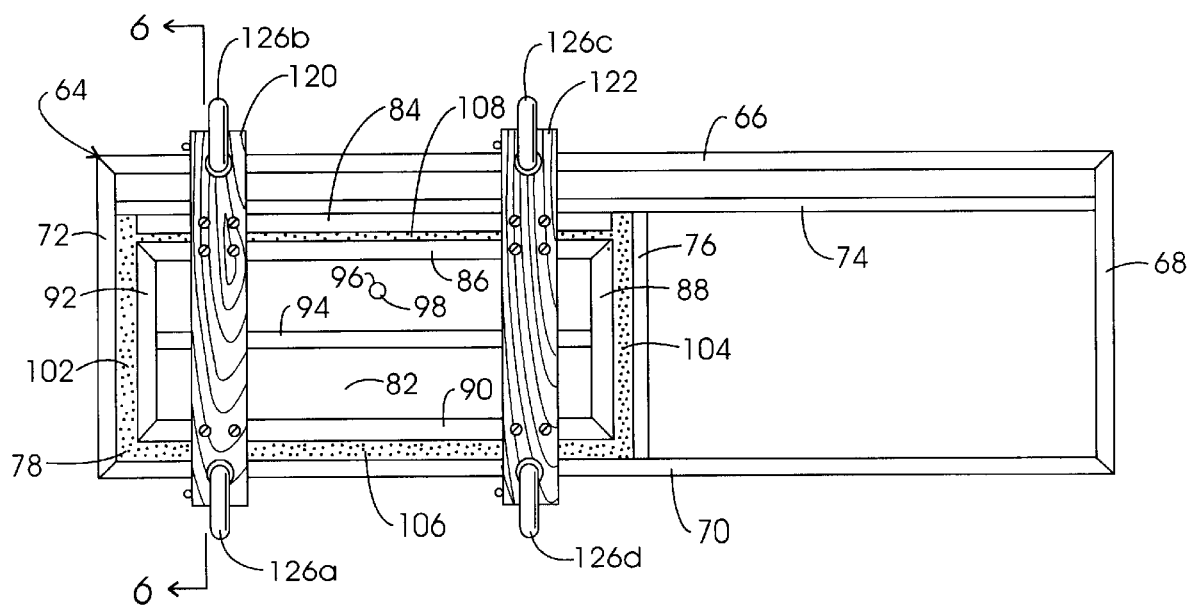
FIG. 5 is a top elevational view of a mold and a plug used in accordance with the present invention to form a module of one size and shape.
Figure 6:
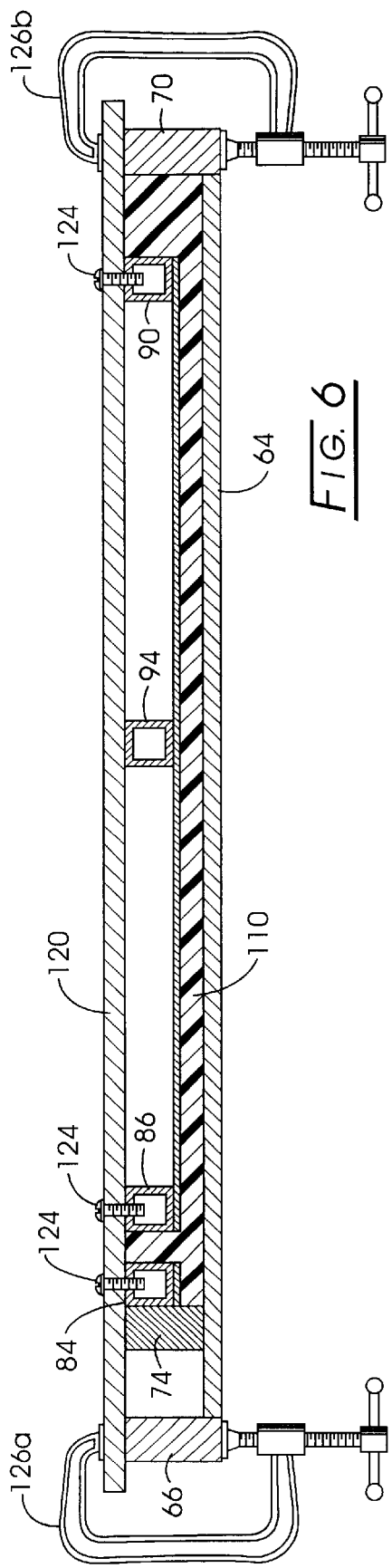
FIG. 6 is a cross-section of the mold/plug arrangement taken along line 6—6 of FIG. 5.

With respect to the custom manufacture of SS module 46, reference is made initially to FIGS. 5 and 6. The molding operation commences with mold 64 that is formed from first outer wall 66, second outer wall 68, third outer wall 70, and fourth outer wall 72. Although any suitable size and shape of mold 64 is accepted for present purposes, preferably, each pair of oppositely-disposed walls are parallel making mold 64 rectangular in shape. Mold 64 also may be subdivided by dividers 74 and 76, depending upon the size and shape of the part to be molded.

Once mold 64 is suitably configured, it is filled with resinous mixture 78 which generally comprises a between about 28 wt-% and 37 wt-% of acrylic resin, polyester resin, or a blend thereof with the balance being aluminum trihydrate (ATH) powder (solid filler). The percentages will vary depending on the micron size on the ATH used the ability of the resin(s) to wet the powder and form a homogeneous mix. Generally, the larger the ATH particle size is, the less resin required. Tinctorial pigments and/or colored solids often are added to the ATH to provide, for example, a granite look. Less resin is required with such colored solids addition. Preferably, the resinous mixture is a mixture of isophthalic neopentyl glycol resin and aluminum trihydrate, both of which are readily commercially available. The mixture is a catalytically cured, often with heating, in the presence of a suitable catalyst, such as, for example, methyl ethyl ketone peroxide (MEKP). The present invention, however, is not limited to these particular materials as it can be practiced with other resinous materials, solids, catalyst, and/or mixtures thereof.

Because mass and/or volume can be correlated to weight (i.e., the resinous mixture is homogeneous and its density is known), the amount of material required per countertop can easily be calculated without waste. After resinous mixture 78 is poured into mold 64, first plug 82 and second plug 84 are selected from an inventory of plugs and placed into resinous mixture 78. First plug 82 preferably includes four walls, 86, 88, 90, and 92, and center brace 94. First plug 82 preferably also includes aperture 96 that is plugged with cap 98. Cap simply can be a 1/8" pipe covered by tape. The purpose of aperture 96 and cap 98 will be apparent from the description below.

As can be seen from FIGS. 5 and 6, plugs 82 and 84 are dimensioned so that there are gaps or spaces (typically called "cavities" in the molding art) 102, 104, 106, 108, and 110 between plugs 82 and 84 and mold 64. Plugs 82 and 84 will be buoyant in resinous mixture 78, so that when they will have a tendency to float in resinous mixture 78 when they placed into mold 64. Thus, plugs 82/84 will need to be pushed down into resinous mixture 78. As plugs 82 and 84 are pushed down into resinous mixture 78, portions of resinous mixture 78 flow into and fill cavities 102, 104, 106, and 108, leaving centrally-disposed work surface 54 formed at the bottom of mold 64 as defined by cavity 110.

Resinous mixture 78 that fills cavities 102 and 104 becomes integrally molded side edges 56 of SS work surface module 46. Resinous mixture 78 that fills cavity 106 becomes integrally molded front edge portion 58. Resinous mixture 78 that fills cavity 108 becomes integrally molded support member or brace 60 of SS work surface module 46. Brace 60 is made sufficiently strong to assist in making work surface module 46 self-supporting. Finally, resinous mixture 78 that fills cavity 110 becomes centrally-disposed work surface 54, the thickness of which is thinner than the thickness of edge portion 56, front portion 58, or brace 60. The thickness of each of the components is controlled by the gap or cavity formed between mold 64 and plugs 82/84. The design of mold 64 and plugs 82/84 in turn determine the location and thickness of edge portion 56, front portion 58, brace 60, and centrally-disposed work surface 54. Transverse securing members 120 and 122 are attached to the plugs by, for example, screws 124 or by other suitable means. "C" clamps 126a–d, or other suitable hold-down means, secure transverse retaining members 120 and 122 to mold 64. Plugs 82 and 84, alternatively, could be placed in mold 64 and then resinous mixture 78 added by pouring, pumping, injection, or any other suitable means.

Resinous mixture 78 then is allowed to gel or partially solidify to a rubbery state. The amount of time (gel time) depends on the catalyst used, ambient air temperature, and other factors known to those skilled in the art. Using the preferred materials described above, gel times are approximately 10–20 minutes. Short gel times are desirable so that the solids filler content in resinous mixture 78 does not precipitate or settle. Such settling would inevitably lead to curling of the final molded part. Once resinous mixture 78 is partially solidified, plugs 82 and 84 are removed. Thereafter, the part will shrink as it completes its cure. Because plug 82 is relatively large, it is more easily removed by removing cap 98 from aperture 96 so that air can be pumped through aperture 96. Such airflow facilitates removal of plug 82. Without aperture 96, a partial vacuum is created between the bottom of plug 82 and centrally-disposed work surface 54 that was formed in gap 110.

As the now rubbery material continues to cure, it generates heat, causing the release of the fugitive solvent content of resinous mixture 78. After about 45–60 minutes post pour, depending on the temperature and cure rate, the SS 46 can be removed from mold 64 with a size and shape that was predetermined by mold 64 and plugs 82/84. SS module 46 then is allowed to complete its cure outside the mold 64 for, say, 4–24 hours.

The difference between the depth of mold 64 and of plugs 82 and 84 depth ideally is constant. In a preferred embodiment, mold 64 is 2 inches deep, and plugs 82 and 84 are 1 7/16" deep. Such dimensions result in central work area 54 having a constant predictable and predetermined poured thickness of 9/16". Of course, alternative thickness' could be manufactured. Having plugs 82 and 84 smaller than the mold 64 allows the manufacturer to pour at different thickness' in specific areas to create support members and edges. For example, in a preferred embodiment, the thickness of central work are 54 is 9/16" (cavity 110 ) and the thickness of both side portion 56 and front portion is 58 is 1 11/16" (cavities 102, 104, 106, and 108 ). Central work surface 54 can be mechanically sanded to reduce the thickness of central work area 46 to ½" and the thickness of edge/front portions 56/58 and brace 60 to 1½". Sanding also gives the work surface a finished appearance. Planing and sanding operations also are a normal part of SS manufacturing technique used to remove any surface irregularities and/or thickness variances.

In a preferred embodiment, mold 64 is 146" long, 30½" wide or 36½" wide, and 2" deep. Preferred plugs are 10", 12", 16", 36", 48", 60", and 72" long, and 10", 13", 16", 21", and 24" wide. These lengths of plugs can be used to pour any finished lengths required, in 1" increments, from 10" to 146" by (1) combining lengths and (2) varying the thickness of end widths 102 and 104 (FIG. 5). Since shrinkage of resinous mixture 78 is a constant, e.g., ⅛" per foot, it can be taken into account during set-up and pouring operations as described above and as illustrated in Table 1 below.

TABLE 1

| Ordered Length (in) | Poured Length (in) | Plug Length (in) | Gaps 104 & 106 Poured Thickness (in) |
|---|---|---|---|
| 12 | 12 3/16 | 10 | 1 3/32 ea. |
| 25 | 25 5/16 | 10 + 12 | 1 25/32 ea. |
| 54 | 54 5/8 | 36 + 16 | 1 5/32 ea. |
| 80 | 80 15/16 | 48 + 12 + 16 | 2 7/16 ea. |
| 122 | 123 3/8 | 72 + 48 | 1 11/16 ea. |

The width of the plugs is determined by the prevailing cabinetry sizes in the market. For example, 21" and 24" widths today are standard for cabinets that have a back wall (bathroom vanities and kitchen tops), while 10"–13" or 14"–16" widths are used for raised ledge areas. By combining widths together, peninsular and island countertops are accommodated as illustrated in Table 2 below.

TABLE

| PLUG SIZE (in) | FINISHED TOP WIDTHS (in) |
|---|---|
| 10 | 12–14 |
| 13 | 15–17 |
| 16 | 18–21 |
| (2) 10 | 22–24 |
| 21 | 21–24 |
| 24 | 25–28 |
| 10 + 13 | 27–29 |
| (2) 13 | 28–30 |
| 10 + 16 | 28–32 |
| 13 + 16 | 31–33 |
| 21 + 10 | 33–36 |
| 24 + 10 | 36–38 |
| 24 + 13 | 39–43 |
| 24 + 16 | 42–46 |

Referring to FIGS. 5 and 6, by using divider members 74 and 76, and different or multiple plugs, modules of different widths and lengths can be manufactured with the same mold 64. Since the resinous liquid mixture volume is homogeneous and its density is known, the amount of resinous liquid mixture needed per molded countertop can be calculated from the volume of the cavities (gaps) between the mold and the plugs.

The work surface modules can be installed on top of cabinets by conventional means to form cabinet/work surface combinations. During installation, the work surface is positioned so that brace portion 60 will cooperate with the cabinet to provide support for the work surface module. Front edge portion 58 and/or side edge portions 56 also may provide support for the work surface module, as shown in FIGS. 1 and 4. Brace portion 60 and/or front and side edge portions 56, 58 are adhered to the cabinet preferably by an adhesive or other suitable means.

Figure 7:
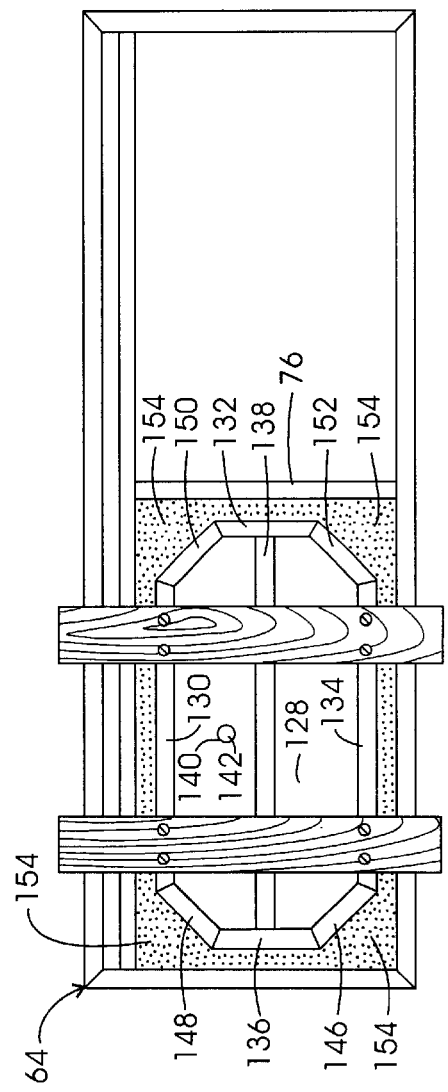
FIG. 7 is a top elevational view of a plug/mold arrangement used in accordance with the present invention to form a module of a second size and shape.

Referring to FIG. 7, an alternative embodiment of the present invention is shown wherein alternative plug 128 is placed into mold 64 along with divider 76. Plug 128 is composed of four primary walls 130, 132, 134, and 136; and four corner walls 146, 148, 150 and 152. Plug 128 is reinforced by center brace 138 that spans between walls 132 and 136. Plug 128 also has aperture or hole 140 that is stoppered by cap 142. The corner walls create enlarged cavity 154 that is formed between the outside of the walls that form plug 128 and the inside of the walls that form mold 64. Cavity 154 is filled with the resinous mixture. The hardened resinous mixture in cavity 154 can be finished on all sides to create, for example, a work surface module used, for example, as a countertop for a kitchen island. The four outside corners also may be rounded or radiused to create an island having a curved outside corners for safety and/or aesthetics. In this embodiment, the radius of these corners may be up to, for example, six inches. Alternatively, plug 128 could be altered to create work peninsular countertop work surface module by eliminating corner walls 146 and 148, and directly connecting primary walls 130, 134, and 136 to form a rectangular shaped end.

Figure 8:
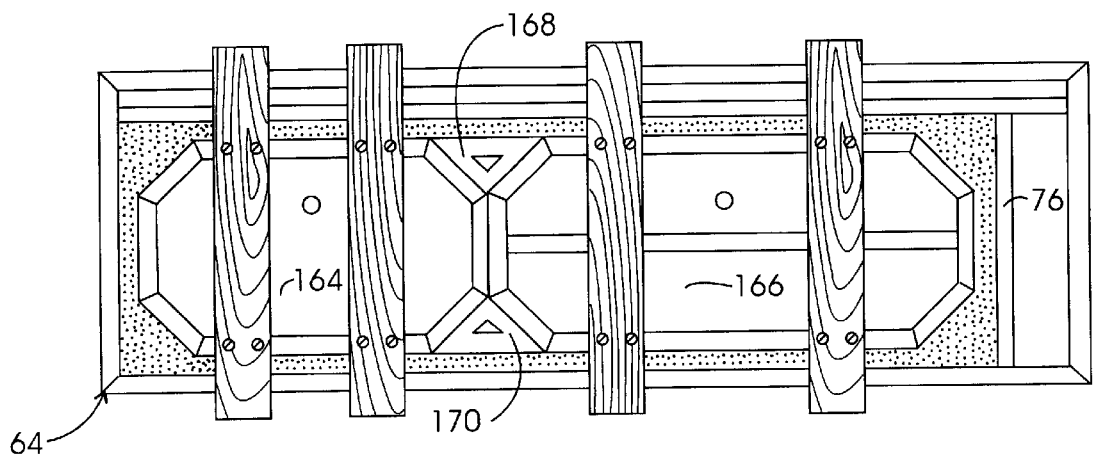
FIG. 8 is a top elevational view of a plug/mold arrangement used in accordance with the present invention to form a module of a third size and shape.

Referring to FIG. 8, another alternative embodiment of the present invention is shown wherein multiple plugs are combined to create a larger work surface module. In this embodiment, nearly the full length of the mold 64 is occupied by four plugs with divider 76 determining the overall length of mold 64 used. First plug 164 and second plug 166 are similar in shape to plug 128 shown in FIG. 7. Third plug 168 and fourth plug 170 are disposed in the cavities formed between first plug 164 and second plug 166. The third and fourth plugs may be secured with clamps to mold 64. Together, these four plugs are used to form a long work surface module that can be used, for example, as a countertop for a large kitchen island. Pouring and curing of the resinous mixture and demolding of the molded part are practiced in the same manner as described above.

Figure 9:
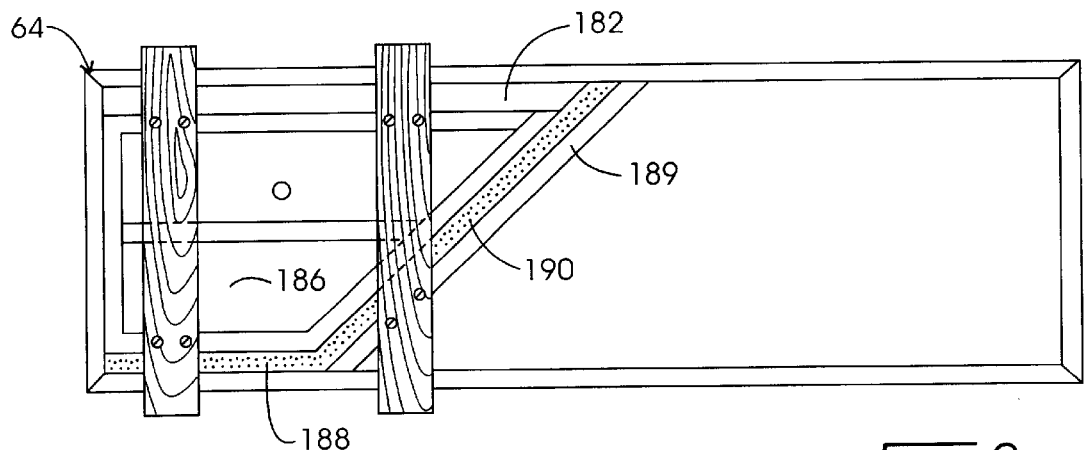
FIG. 9 is a top elevational view of a plug/mold arrangement used in accordance with the present invention to form a module of a fourth size and shape.

Referring to FIG. 9, a mold/plug/divider member arrangement for making a trapezoidal shaped work surface module is shown. Dividers 182 and 184 partition mold 64. After the resinous mixture is poured into the mold 64, trapezoidally shaped plug 186 is placed in mold 64. Cavities 188 and 190 will create integral edge portions on the two outside edges of the trapezoidal shaped work surface module.

Figure 10:
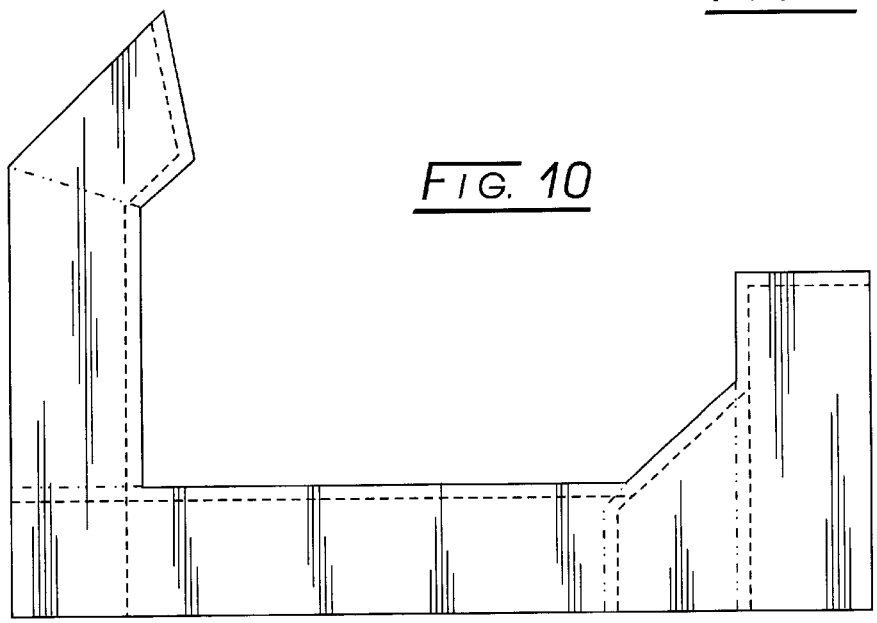
FIG. 10 is a top elevational view of a completed work surface made in accordance with the present invention.

FIG. 10 illustrates how a plurality of differently sized and shaped SS modules can be combined to create a complete kitchen countertop structure. Various of the work surface modules can be attached directly to cabinets or other supporting structures with adhesive, for example. The work surface modules preferably also are attached to each adjacent module, such as with a PLEXUS brand acrylic adhesive (supplied by ITVV) to provide a good mechanical bond between such modules. After adhering the modules together, their outer edges can be routed, if desired, holes drilled for a sink or the other drop-in structure, and the top central working surface finished to achieve the desired look.

The resulting one-piece self-supporting countertop can eliminate between 40% and 75% of the installation time required to manually, or with automatic equipment, cut, fit, glue, dry, and trim conventional SS countertops. Also saved is the extra length and width of material that typically is ordered in order to accomplish these tasks (including a ⅛" allowance for saw cut waste and the necessity of ordering standard industry lengths of flat SS stock of 8 ', 10', and 12' sections). The prior art process of gluing of edge portions, side portions, and backsplashes also produces a countertop that can easily be broken if picked up in a flat position because of its lack of structural integrity. The inventive self-supporting modular SS's, however, display sufficient structural integrity that they can be picked up by their edges and backsplashes without risk of breakage. Moreover, many precautions are required when practicing the prior art gluing process, such as, for example, using corner support blocks, extra support materials, expensive special colored adhesives kits (that may average as high as $ 50.00 per kitchen top), and specially trained personnel. Additionally, if precise techniques are not used when gluing on the front and edge portions, lines or seam lines become evident, causing rejection by consumers and necessitating the re-manufacturing of the countertops from scratch. The inventive self-supporting modular SS's, however, do not require such edge and backsplash gluing operations and, therefor, cannot visualize any seam lines.

The process of the present invention additionally can save up 75% in fabricating time over conventional SS parts and permits on-site installation without any off-site shop time because the modules can be joined together in the field. Finally, some do-it-yourself homeowners even may be able to install their own countertops due to the unique design of and manufacturing process employed in the inventive SS's.

As has been shown in the drawings, the plugs can be made in a plethora of different shapes and sizes, and are adapted to be used with divider members to create any size cavity for filling by the resinous mixture. The present invention, thus, produces modules of variable length, width, and shape, for use with virtually any cabinet, new or existing. Thus, the inventive modules are appropriate for new home construction as well as for remodeling of homes. In a preferred embodiment, the modules can be mass produced in one inch increments in lengths ranging from 12" to 144" at a cost that is far less than conventional SS's. The invention, then, can take advantage of the fact that commercial cabinets generally have standard depths and widths, while retaining the manufacturing flexibility to manufacture non-standard custom orders.

Previous attempts to mold in thicker countertop edges appear to have failed because of the uneven shrinkage of the part during cooling which shrinkage is exacerbated by irregularly shaped parts. Thicker built-up edges and wider tops enhance curl of the part due to the resulting mass imbalance. Thicker areas shrink at a greater rate than do thinner areas of the part. The thinner central are of the part also shrinks greater because it cools off over a longer period of time, thus releasing more styrene as a vapor rather than as a liquid for curing. Under normal conditions, a proper resin to solids balance eliminates curl. Such is an achievement of the present invention. Should some curl occur, however, four techniques have been developed in order to overcome any curling of the parts:

(1) Since cure of the resinous mixture involves the transformation of the mixture from a liquid state to a rubbery state to a hardened state, corners and edges prone to curl can be pre-stretched by placing shims under such areas. The part is shimmed after the plugs and dividers are removed from the mold and the casting is still in its flexible or rubbery state. Generally, shimming is necessary only when cast tops are wider than about 28"–30".

(2) The central work area of the countertop is poured thicker (⁹⁄₁₆") than desired for the final product for two reasons: (a) to take into account any surface irregularities in the mold, and (b) to be able to plane the surface flat, eliminating waves and curling. Sanding, however, is standard in the industry even for flat sheets. It will be recalled that temporary support member 62 (see FIG. 4) is used during the sanding operation in order to eliminate/dampen vibration of the part during sanding. Such temporary bracing usually is only required in unsupported areas wider than about 16". After support member 62 is affixed to the countertop with contact cemented (for removal, if desired), the tops are sent through the planer sander, bottom-side up, and planed to 1⁹⁄₁₆" in order to level the bottom. The parts then can be flipped right-side up and an additional ¹⁄₁₆" removed to level the central area of the top surface of the part to the industry standard thickness of ½"±¹⁄₃₂".

(3) During and after the curing process, the parts are stored on a ½" concave surface shaped rack to pre-stretch and eliminate the tendency of the edges to curl. When placed flat, the center section of the top will lay flat due to its own weight.

(4) The tops optionally can be straightened or stretched, by turning them upside down, shimming their ends up ½" to ¾" and clamping down the center for 1–8 hours. Such an operation normally cannot be done with glued edge tops without the risk of their breaking.

The inventive process is applicable to single and/or continuous casting operations using open or closed molds, and is not limited to module shape, width, length, or thickness. The unique accomplishments of the present invention are achieved through judicious selection of plugs (dimension and shape) and mold (dimension and shape). Conventional industry installation procedures are followed for installation of sinks and cook tops (e.g., cut-outs) and joining of the modules (called "field seaming") together (see FIG. 10).

The molds and plugs can be manufactured from a variety of materials, such as, for example, Formica® laminates, wood, stainless steel, fiberglass, but preferably aluminum because of its consistent thickness, weight, mold release characteristics, durability, and cost. While wax initially was applied to the inside of the mold and to the plugs as a release agent, presently Teflon® brand polytetrafluoroethylene (preferably, premium grade or Silverstone® brand) is used to coat the mold and plugs as a release agent.

It is to be understood that the present invention has been described in an illustrative manner and the terminology that has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

What is claimed is:

1. A method for making a self-supporting work surface module adapted for mounting onto a support structure, which comprises the steps of:
   (a) obtaining a mold;
   (b) selecting one or more plugs from an inventory of plugs of different lengths and widths;
   (c) placing the selected one or more plugs into the mold to form cavities between said mold and said one or more plugs, said cavities defining:
      (i) a centrally-disposed molded work surface having a bottom face and a top face, and having a given thickness and having at least a first edge and a second edge, and corners;
      (ii) a first molded integral edge portion joined to said first edge and extending downwardly from said centrally-disposed molded work surface; and (iii) at least one molded integral brace portion joined to the bottom of said centrally-disposed molded work surface to make said module self-supporting at said centrally-disposed molded work surface;

(d) filling said cavities with a balanced moldable resin and fillers mixture and permitting said mixture to at least partially cure; and (e) removing said plugs from said mold prior to shrinkage.

2. The method of claim 1, wherein said cavities also define:

(iv) a second molded edge portion joined to said second edge and extending upwardly from said centrally-disposed molded work surface.

3. The method of claim 1, wherein one or more modules removed in step (e) are combined and mounted on site onto one or more support structures to form a work surface.

4. The method of claim 1 wherein the moldable resin and fillers mixture is a mixture of an orthophthalic resin and calcium carbonate.

5. The method of claim 1, wherein the resins and fillers mixture is a mixture of isophthalic neopentyl glycol resin and aluminum trihydrate.

6. The method of claim 1, wherein the thickness of both said integral brace portion and said integral edge portion is greater than the thickness of said central work surface.

7. The method of claim 1, wherein said resinous mixture comprises between about 28 wt-% and 37 wt-% resin.

8. The method of claim 7, wherein said resinous mixture is selected fr om isophthalic neopentyl glycol resin and aluminum trihydrate, and orthophthalic resin and calcium carbonate.

9. The method of claim 1, wherein dividers also are placed in said mold to subdivide said mold.

10. The method of claim 1, wherein after said plugs are removed from said mold in step (e) said corners and outer edges of said at least partially cured module are shimmed to suppress curling of said edges.

11. The method of said 1, wherein said plugs are removed from said mold in step (e) while said resinous mixture is only partially cured and thereafter said module is permitted to fully cure while still inside said mold or after said module has been removed from said mold.

12. The method of claim 11, wherein said module is placed on a concave surface to pre-stretch said module while said module is permitted to fully cure.

13. The method of claim 11, wherein module is placed upside down, the outer edges of the module are shimmed, and the centrally-disposed molded work surface is clamped down to suppress curling of said module.

14. The method of claim 1, wherein said support structure is a cabinet.

15. The method of claim 1, wherein said mold and said plugs are made from a material selected from wood, stainless steel, glass fiber reinforced resin, and aluminum.

16. A method for making a self-supporting work surface module adapted for mounting onto a support structure, which comprises the steps of:

(a) obtaining a mold;

(b) selecting one or more plugs from an inventory of plugs of different lengths and widths;

(c) placing the selected one or more plugs into the mold to form cavities between said mold and said one or more plugs, said cavities defining:

(i) a centrally-disposed molded work surface have a bottom face and a top face and having a given thickness and having at least a first edge and a second edge, and corners;

(ii) a first molded integral edge portion joined to said first edge and extending downwardly from said centrally-disposed molded work surface;

(iii) at least one molded integral brace portion joined to the bottom of said centrally-disposed molded work surface to make said module self-supporting at said centrally-disposed molded work surface; and (iv) a second molded edge portion joined to said second edge and extending upwardly from said centrally-disposed molded work surface (d) filling said cavities with a balanced moldable resin and fillers mixture that contains between about 28 wt-% and 37 wt-% resin and permitting said mixture to at least partially cure to form said module; and (e) removing said plugs from said mold prior to shrinkage.

17. The method of claim 16, wherein one or more modules removed in step (e) are combined and mounted on site onto one or more support structures to form a work surface.

18. The method of claim 16 wherein the moldable resin and fillers mixture is a mixture of an orthophthalic resin and calcium carbonate.

19. The method of claim 16, wherein the resins and fillers mixture is a mixture of isophthalic neopentyl glycol resin and aluminum trihydrate.

20. The method of claim 16, wherein the thickness of both said integral brace portion and said integral edge portion is greater than the thickness of said central work surface.

21. The method of claim 16, wherein dividers also are placed in said mold to subdivide said mold.

22. The method of claim 16, wherein after said plugs are removed from said mold in step (e) said corners and outer edges of said at least partially cured module are shimmed to suppress curling of said edges.

23. The method of said 16, wherein said plugs are removed from said mold in step (e) while said resinous mixture is only partially cured and thereafter said module is permitted to fully cure while still inside said mold or after said module has been removed from said mold.

24. The method of claim 23, wherein said module is placed on a concave surface to pre-stretch said module while said module is permitted to fully cure.

25. The method of claim 23, wherein module is placed upside down, the outer edges of the module are shimmed, and the centrally-disposed molded work surface is clamped down to suppress curling of said module.

26. The method of claim 16, wherein said support structure is a cabinet.

27. The method of claim 16, wherein said mold and said plugs are made from a material selected from wood, stainless steel, glass fiber reinforced resin, and aluminum.

* * * * *